United States Patent [19]

Ehresmann

[11] 4,326,490

[45] Apr. 27, 1982

[54] FUEL PREHEATER FOR INTERNAL COMBUSTION ENGINES

[75] Inventor: Ewald Ehresmann, Manly, Iowa

[73] Assignee: Combustion Research, Inc., Bloomfield, N. Mex.

[21] Appl. No.: 98,997

[22] Filed: Nov. 30, 1979

[51] Int. Cl.³ .............................................. F02M 31/00
[52] U.S. Cl. .................................... 123/557; 123/549; 261/142; 261/70
[58] Field of Search ............... 123/549, 557, 558, 522, 123/523, 552; 261/142, DIG. 6, 555, 70, 142

[56] References Cited

U.S. PATENT DOCUMENTS

| 781,936 | 2/1905 | Cook | 123/558 |
|---|---|---|---|
| 817,941 | 4/1906 | Stute | 261/DIG. 6 |
| 1,271,181 | 7/1918 | Lenhart | 261/DIG. 6 |
| 1,603,660 | 10/1926 | Cassella | 123/557 |
| 2,232,419 | 2/1941 | Warwan | 261/270 |
| 3,306,273 | 2/1967 | Dolphin | 123/549 |
| 3,722,837 | 3/1973 | Dapprich | 261/70 |
| 3,886,919 | 6/1975 | Freeman | 123/558 |
| 3,951,124 | 4/1976 | Fairbanks | 123/557 |
| 3,955,546 | 5/1976 | Lee | 123/557 |
| 4,050,419 | 9/1977 | Harpman | 261/142 |
| 4,106,453 | 8/1978 | Burley | 123/555 |
| 4,151,821 | 5/1979 | Wichman | 123/557 |

FOREIGN PATENT DOCUMENTS

| 271641 | 5/1913 | Fed. Rep. of Germany | 261/70 |
|---|---|---|---|
| 2238599 | 2/1974 | Fed. Rep. of Germany | 261/142 |

Primary Examiner—Ronald H. Lazarus
Attorney, Agent, or Firm—Harvey B. Jacobson

[57] ABSTRACT

A fuel preheater for an internal combustion engine is described including a hollow housing which is mounted within an insulated cover. The hollow housing is provided with a fuel inlet at its upper end which is in communication with the engine fuel pump. A valve member is vertically movably mounted in the fuel inlet and is adapted to close the fuel inlet at times. A fuel atomizer is provided on the lower end of the valve member for atomizing the fuel supplied thereto. A float is mounted within the housing and is operatively connected to the valve member for closing the valve member upon a predetermined level of fuel accumulating in the lower end of the housing. Insulated electrical leads extend through the housing below the fuel atomizer for heating the atomized fuel. The housing is provided with a fuel discharge which is in communication with the carburetor of the engine. An air inlet is provided at one end of the housing to permit heated air to pass therethrough. A spring loaded valve normally closes the air inlet but is opened by the vacuum present within the housing. The opposite ends of the housing are provided with spring loaded covers or plates which open the opposite ends of the housing upon a predetermined pressure being experienced within the housing.

10 Claims, 4 Drawing Figures

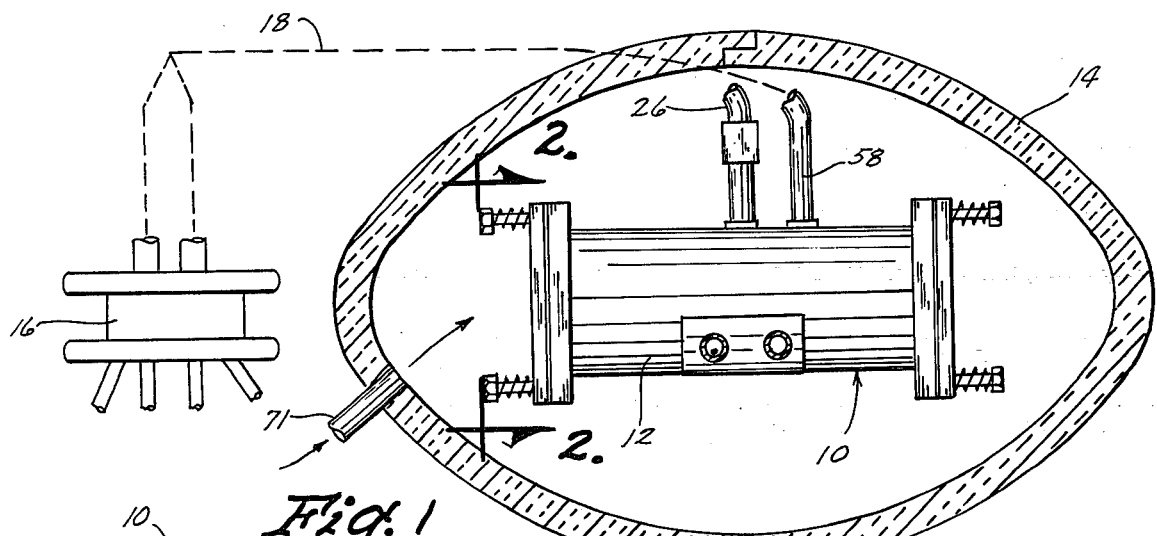
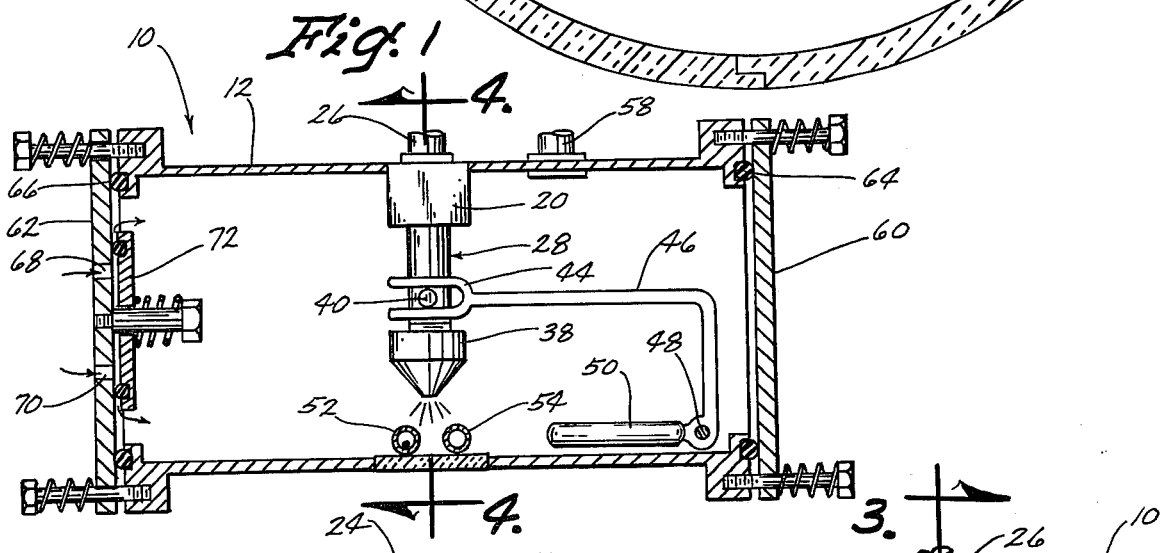
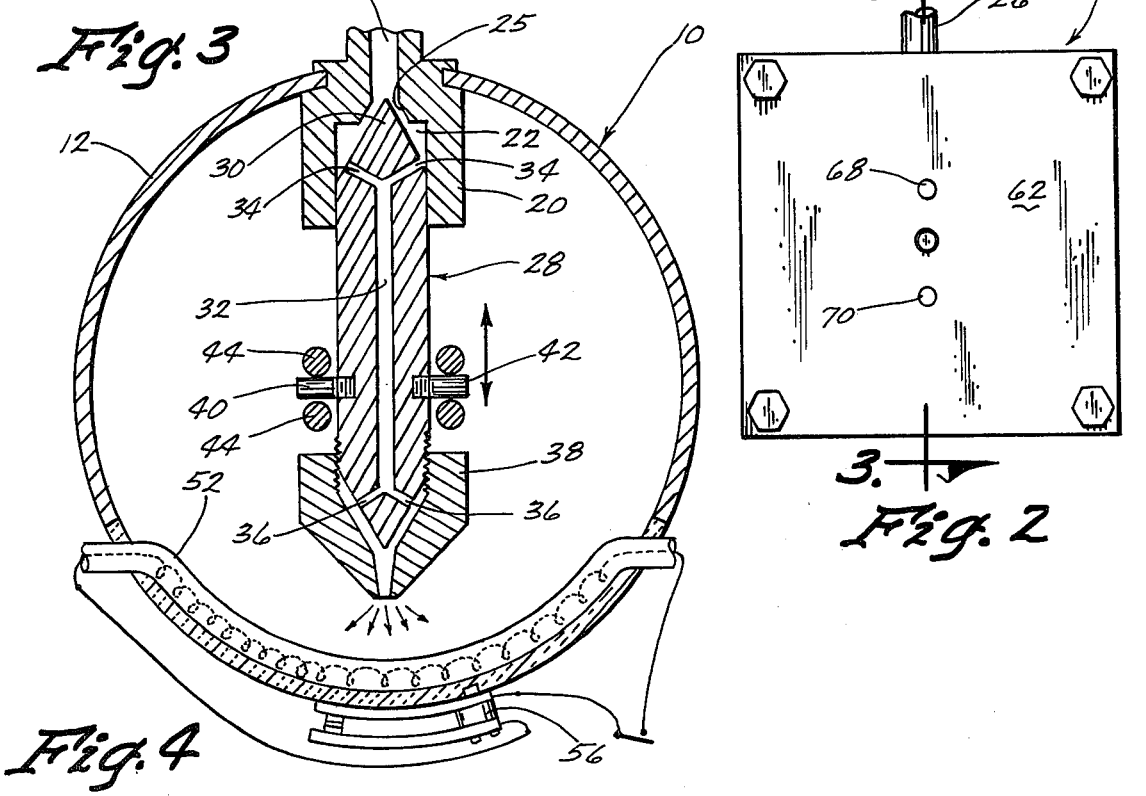
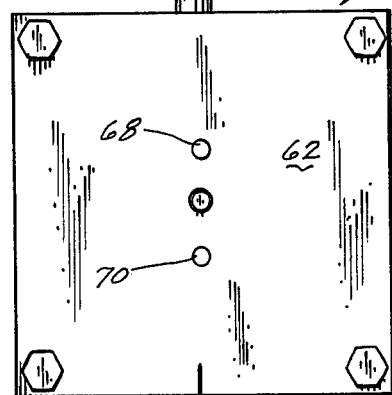
Fig. 1
Fig. 2
Fig. 3
Fig. 4

FUEL PREHEATER FOR INTERNAL COMBUSTION ENGINES

BACKGROUND OF THE INVENTION

The present invention relates generally to a fuel system for an internal combustion engine and more particularly to an improved fuel system which vaporizes and preheats fuel prior to introduction into the carburetor.

It has been previously recognized that fuel burns more efficiently in an internal combustion engine if it is vaporized and preheated prior to combustion. Accordingly, numerous accessories, attachments and modifications for fuel systems have been provided. Such devices, however, have generally been directed solely to increasing the efficiency of combustion without otherwise affecting the rate of fuel consumption of the engine. Other devices have been proposed for cutting the fuel consumption of an internal combustion engine but these generally do not provide a preheating of the fuel and often result in significant power loss for the engine.

Applicant's earlier filed application, Ser. No. 64,051 filed on Aug. 6, 1979 represented a significant improvement in the fuel systems for internal combustion engines and the instant invention represents an improvement over the earlier filed application.

Accordingly, a primary object of the invention is to provide an improved fuel system for an internal combustion engine.

A further object is to provide a fuel system wherein fuel is vaporized and preheated prior to introduction to the carburetor.

A further object of the invention is to provide an improved fuel preheater for an internal combustion engine.

A still further object of the invention is to provide a fuel preheater for internal combustion engine which includes means for preventing excessive accumulations of fuel therein.

A still further object of the invention is to provide a fuel preheater for an internal combustion engine including means thereon for preventing excessive pressures from being present within the heater.

A still further object of the invention is to provide a fuel preheater for an internal combustion engine which is extremely efficient.

Finally, an object is to provide a fuel system which is simple in construction, automatic and efficient in operation and easily installed on existing engines.

SUMMARY OF THE INVENTION

The fuel system of the present invention comprises a cylindrical housing mounted within an insulated cover. A fuel inlet is provided at the upper end of the housing which is in communication with the fuel pump of the engine. A valve member is vertically movably mounted in the fuel inlet for closing the fuel inlet at times and has a fuel passageway extending therethrough. A fuel atomizer or vaporizer is mounted on the lower end of the valve member for atomizing the fuel being supplied thereto. A pair of insulated electrical leads extends through the housing below the fuel atomizer for heating the atomized fuel. A float is pivotally mounted within the housing and is operatively connected to the valve member for closing the valve member when a predetermined level of fuel is experienced within the housing. The opposite ends of the housing are provided with spring loaded plates which normally seal the opposite ends of the housing but which open should a predetermined pressure be experienced within the housing. An air inlet is provided at one end of the housing to permit heated air to pass therethrough. A spring loaded valve normally closes the air inlet but is opened by vacuum within the housing. The housing has a fuel discharge extending therefrom to the engine carburetor.

BRIEF DESCRIPTION OF THE DRAWINGS

FIG. 1 is a schematic fluid circuit diagram of the fuel system of the invention;

FIG. 2 is an enlarged sectional view taken along line 2—2 of FIG. 1;

FIG. 3 is a sectional view taken along line 3—3 of FIG. 2; and

FIG. 4 is an enlarged sectional view taken along line 4—4 of FIG. 3.

DESCRIPTION OF THE PREFERRED EMBODIMENT

Referring to the drawings, the numeral 10 designates the preheater of this invention. Preheater 10 generally comprises a cylindrical housing 12 which is enclosed within an insulated cover 14 to prevent cold air from coming into contact with the heater itself. In FIG. 1, the numeral 16 refers to a carburetor having fuel line 18 extending therefrom.

Housing 12 is provided with a fuel inlet 20 at its upper end which includes an open lower end 22 which is in communication with passageway 24 extending therefrom. A valve seat 25 is provided between passageway 24 and the open lower end 22. Inlet 20 is in communication with line 26 which is in communication with a conventional fuel pump designed to supply fuel under pressure to the inlet 20. Valve member 28 has its upper end vertically movably received by the inlet 20 as best illustrated in FIG. 4. Valve member 28 is provided with an upper end portion 30 which is designed to seat upon the valve seat 25 when the valve member 28 is in its uppermost position to close the fuel passageway 24. Valve member 28 is provided with a longitudinally extending fuel passageway portion 32 having a plurality of fuel passageway 34 extending upwardly and outwardly from the upper end thereof. As seen in FIG. 4, fuel passageways 34 extend outwardly to the outer surface of the valve member 28 below the upper end portion 30. Valve member 28 is also provided with a plurality of fuel passageways 36 which extend outwardly and downwardly from the lower end of the passageway portion 32.

Mounted on the lower end of the valve member 28 is a fuel atomizer 38 designed to atomize the fuel being supplied thereto through the valve member 28. A pair of laterally extending pins 40 and 42 are mounted on the valve member 28 and are embraced by the yoke 44 of linkage 46. Linkage 46 is pivotally connected to the housing 12 at 48 and has float 50 mounted thereon. Thus, float 50 is designed to vertically move the valve member 28 through the linkage 46 as will be described in more detail hereinafter.

A pair of insulated electrical leads 52 and 54 extend through the housing 12 below the atomizer 38 for heating the atomized fuel. The leads are operatively connected to a source of electrical energy and to a thermostat 56.

Housing 12 is provided with a fuel discharge 58 which is in communication with the line 18 extending from carburetor 16. Housing 12 is provided with spring loaded plates or covers 60 and 62 at its opposite ends which normally seal the opposite ends of the housing. As seen in FIG. 3, sealing ring 64 is provided between the end of the housing 12 and the cover 60 with sealing ring 66 being provided between the end of the housing 12 and the cover 62. Covers 60 and 62 are spring loaded to permit the covers to move outwardly from the housing upon a predetermined pressure being experienced within the housing. Cover 62 is provided with a pair of inlet air openings 68 and 70 extending therethrough which are normally closed by a spring loaded valve 72 mounted on the inside surface of the cover 62 as illustrated in FIG. 3. Valve 72 normally closes the air inlets 68 and 70 but opens the openings 68 and 70 when a predetermined vacuum is present within the housing. The vacuum within the housing is created by the carburetor being mounted on the intake manifold of the engine. Preferably, the intake 71 is located in the vicinity of the engine manifold so that heated air will be drawn into the cover 14 and housing 12.

On operation, fuel under pressure is supplied to the fuel inlet 20 by means of the line 26. Valve member 28 is normally in the position illustrated in FIG. 4 so that fuel passing downwardly through the passageway 24 may enter the passageway portion 32 by means of the passageways 34. The fuel under pressure is supplied to the fuel atomizer 38 which atomizes the fuel and sprays the fuel downwardly onto the hot electrical leads which heats the atomized fuel. Valve member 28 remains open but would be closed or moved to its upper position should float 50 experience an undesirable level of fuel within the housing.

Heated air is also drawn into the interior of the housing 12 through the openings 68 and 70 and the heated air is mixed with the heated vaporized fuel within the housing. Air is drawn into cover 14 through inlet 71 which draws hot air from the vicinity of the engine exhaust manifold. The heated fuel-air mixture is then drawn outwardly from the housing 12 through the discharge 58 and to the carburetor 16 through the line 18. As previously stated, the spring loaded plates 60 and 62 are provided to act as an explosion-proof device to prevent an undesirable pressure from building up within the housing 12.

Thus it can be seen that a novel fuel preheater has been provided which not only preheats the fuel but which atomizes the same to enhance the combustion of the fuel within the engine. The apparatus of this invention not only atomizes and heats the fuel but does so in an efficient manner with a maximum of safety features. The apparatus may be easily mounted on conventional engines with a minimum of modification. Thus it can be seen that the invention accomplishes at least all of its stated objectives.

I claim:

1. In the fuel system of an internal combustion engine including a fuel pump for supplying fuel to a carburetor and a fuel heater imposed in the fuel line, said fuel heater comprising:
   (a) a hollow housing having a fuel inlet in communication with said fuel pump, said housing having upper and lower ends,
   (b) a fuel atomizer means in operative communication with said fuel inlet for atomizing fuel supplied thereto by said fuel pump,
   (c) a valve means between said fuel inlet and said atomizer means for interrupting the supply of fuel to said atomizer means upon a predetermined level of fuel in said housing being present at the lower end of said housing,
   (d) a fuel heating means in said housing below said atomizer means for heating the atomized fuel,
   (e) said housing having an air inlet for permitting ambient air to enter said housing for mixture with said heated and atomized fuel,
   (f) said housing having a fuel discharge in operative communication with said carburetor for supplying the heated and atomized fuel to said carburetor,
   (g) float means mounted in the lower end of said housing and connected to said valve means for closing said valve means when said predetermined level of fuel in said housing is present,
   said fuel inlet being mounted in the upper end of said housing and having an open lower end, said fuel inlet having a valve seat formed therein above its open lower end, said valve means comprising a valve member vertically movably mounted in said open lower end of said fuel inlet and having an upper end capable of seating upon said valve seat to close said fuel inlet, said valve member having a fuel passageway formed therein extending from a location below said upper end to its lower end; said atomizer means being mounted on the lower end of said valve member; said float means being operatively connected to said valve member for moving said valve member to its seating position on said valve seat.

2. The fuel system of claim 1 wherein an insulated cover encloses said housing.

3. The fuel system of claim 1 wherein said housing has at least one spring-loaded cover mounted thereon which is normally closed but which opens the interior of said housing to the atmosphere upon a predetermined pressure being experienced in said housing.

4. The fuel system of claim 1 wherein said fuel heating means comprises insulated electric leads extending through said housing.

5. The fuel system of claim 1 wherein a spring-loaded valve means normally closes said air inlet but is opened in response to vacuum within said housing.

6. The fuel system of claim 3 wherein said housing has opposite ends and wherein a spring-loaded cover means is mounted at each of said ends.

7. The fuel system of claim 5 wherein said air inlet is positioned adjacent the engine manifold so that heated air is drawn into said housing through said air inlet.

8. The fuel system of claim 4 wherein said electrical leads are connected to a source of thermostatically controlled electrical energy.

9. In the fuel system of an internal combustion engine including a fuel pump for supplying fuel to a carburetor and a fuel heater imposed in the fuel line, said fuel heater comprising:
   (a) a hollow housing having a fuel inlet in communication with said fuel pump, said housing having upper and lower ends,
   (b) a fuel atomizer means in operative communication with said fuel inlet for atomizing fuel supplied thereto by said fuel pump,
   (c) a valve means between said fuel inlet and said atomizer means for interrupting the supply of fuel to said atomizer means upon a predetermined level of fuel in said housing being present at the lower end of said housing, (d) a fuel heating means in said housing below said atomizer means for heating the atomized fuel, (e) said housing having an air inlet for permitting ambient air to enter said housing for mixture with said heated and atomized fuel, (f) said housing having a fuel discharge in operative communication with said carburetor for supplying the mixture of ambient air and heated and atomized fuel to said carburetor, (g) a spring-loaded valve means normally closing said air inlet but capable of opening said air inlet in response to vacuum within said housing.

10. The fuel system of claim 9 wherein said air inlet is positioned adjacent the engine manifold so that heated air is drawn into said housing through said air inlet.

* * * * *